(No Model.)
W. C. WILSON.
LIQUID CONTAINING VESSEL.
No. 341,366. Patented May 4, 1886.
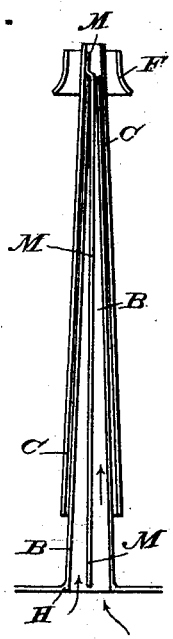
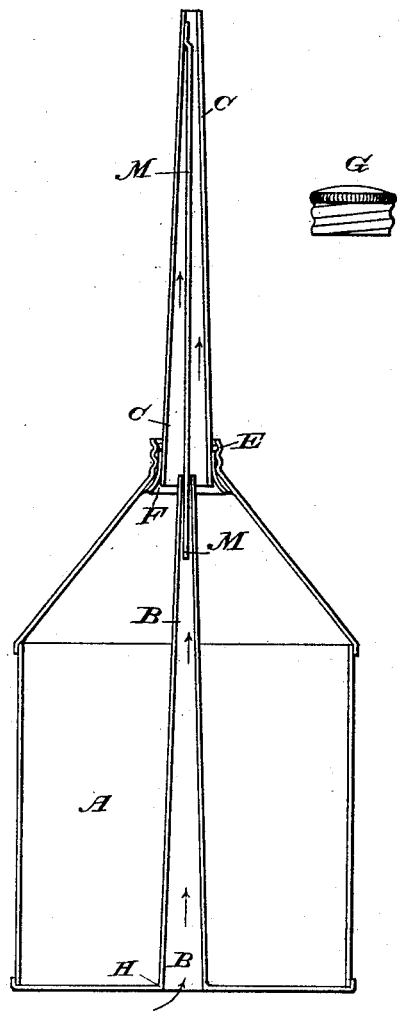
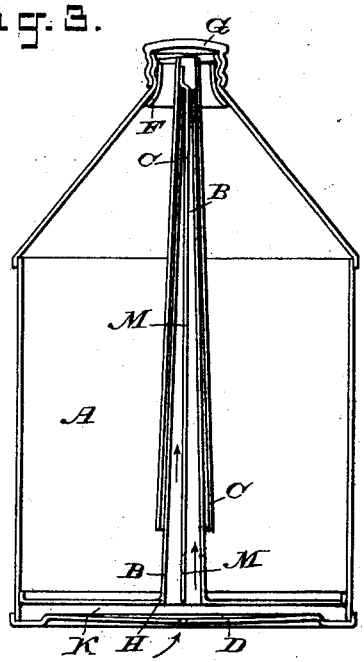
WITNESSES:
George H. Fraser
E. B. Bolton
INVENTOR:
Wm Cotter Wilson

UNITED STATES PATENT OFFICE.

WILLIAM COTTER WILSON, OF BROOKLYN, NEW YORK, ASSIGNOR OF ONE-EIGHTH TO FRANCIS RAYMOND, OF SAME PLACE.

LIQUID-CONTAINING VESSEL.

SPECIFICATION forming part of Letters Patent No. 341,366, dated May 4, 1886.

Application filed September 30, 1884. Serial No. 144,404. (No model.)

*To all whom it may concern:*

Be it known that I, WILLIAM COTTER WILSON, a subject of the Queen of Great Britain, and a resident of 138 Fulton street, Brooklyn, county of Kings, State of New York, have invented new and useful Improvements in Liquid-Containing Vessels, Oilers, Kerosene-Cans, &c., of which the following is a specification.

The object of this invention is to produce by an easy and inexpensive means a liquid-containing vessel that shall possess the property of causing its contents to flow freely or in drops at will, and free from the disadvantages in such vessels as oil-cans, oilers, benzine, varnish, or other liquids requiring a vessel that shall be capable of being made air-tight or open at will.

Oilers have hitherto been made with a variety of vents, that when new perform their functions as desired; but notably when a vent-tube vents on the interior of the vessel it soon becomes clogged by the collection of dust, and is thus rendered inoperative. This applies particularly where such oilers are used in woolen or cotton factories. By this invention such clogging is impossible, inasmuch as the large area through which the air enters in the air-pipe, which tapers to a point from the base upward, allows any dust that might fall on its top to descend downward through the taper cylinder, and thus does not allow the dust to adhere to its inner walls, as is the case where a parallel or bent tube-vent is employed, more especially where a clearing-wire is not employed. Another improvement in this form of vessel is that a spring-bottom attached to the body of the vessel admits of a double action and of attaining a greater air-pressure than with ordinary spring-bottom vessels when used as oilers. This spring-bottom may be applied or not, according to the exigencies of the case—as, for instance, when the vessel, with its internal air-tube, is made of glass and used for any corrosive matter, such as acids, &c. Then such spring is not needed, nor is it when used for kerosene or other packing cans. Another advantage is that each can may be hermetically sealed, even though an open shaft be present in the base of the vessel. This will be found particularly valuable in storing or shipping volatile oils, &c.

Reference to the accompanying drawings will more fully illustrate this invention.

A, Figure 1, represents the body of a vessel; B, the taper air-shaft affixed at the base of the vessel H.

D is the spring-bottom, which may be either screwed or soldered on.

E is a screw-collar affixed to the top of the vessel.

F is a taper socket, through which the spout C is drawn up from the vessel. Within the spout is secured a wire, M, which rises and falls within the air-pipe B, and acts both as a guide for the movable spout and as a clearing-wire.

G is a screw-cap, flanged at its base, with a packing-pad on the inside of top. It will thus be seen that the tube B, when soldered at its base H, becomes a rigid pillar, over which the spout C will rise or fall easily, owing to its taper form, forming, when raised, a perfect discharger of its contents without resort to pressure, as in the case of ordinary spring-oilers. Moreover, when the spring-bottom D is attached, an air-chamber, K, is formed.

When the thumb is impinged on the small hole, as shown by the arrows B', the operator can by pressure force out through the large opening B a stronger stream and of much greater force than is possible when the ordinary spring-bottom is used. This will become obvious when we consider that the large volume of air in the tube B and the chamber K is suddenly compressed by pressure on the secondary bottom D. This will be found of great value when applied for oiling during the operation of boring tubes, as by this means a stream of great force is thrust forward.

Fig. 2 shows the air-chamber B and the movable spout C telescoped one over the other, as when dropped into the can and capped, as at Fig. 3.

Having thus described my invention, I wish it to be understood that I vary the form of vessels and of the material used. For instance, I may make the vessel of glass, with a hole in the bottom, and insert the air-tube B, by blowing or otherwise, at the joint H. This form of vessel I use for acids, inks, sauces, &c.

What I claim as my invention is—

1. A vessel having an open tube affixed to the base and extending up within the vessel, and a movable spout sliding on the fixed tube, substantially as described.

2. The combination, in a vessel, of the tapering air-tube secured to the base, the tapering internal neck, and a sliding discharge-spout, which when raised is held by frictional contact with the tapering neck, the contents of the vessel when discharged escaping between the two tubes and into the discharge-spout, substantially as described.

3. A vessel having a taper air-tube affixed to its base and extending upward, a movable discharge-spout sliding on the air-tube, and a secondary bottom forming an air-chamber, whereby pressure on the secondary bottom will force air into the air-tube, substantially as described.

4. In a vessel, the combination of the open air-tube, the sliding discharge-spout adapted to be dropped within the vessel, and a cap, as G, for closing the mouth of the vessel, substantially as described.

5. The combination of the fixed air-tube, the sliding discharge-spout, and a guide and clearing-wire, substantially as described.

In testimony that I claim the foregoing as my invention I have signed my name, in presence of two witnesses, this 25th day of September, 1884.

WM. COTTER WILSON.

Witnesses:
FRANCIS RAYMOND,
S. B. WILSON.